US012160347B2

United States Patent
Kuriyama et al.

(10) Patent No.: US 12,160,347 B2
(45) Date of Patent: Dec. 3, 2024

(54) SYSTEM, SERVER, AND MOVING BODY

(71) Applicant: TOYOTA JIDOSHA KABUSHIKI KAISHA, Toyota (JP)

(72) Inventors: Kanade Kuriyama, Toyota (JP); Masataka Okuda, Toyota (JP); Kaoru Yoshida, Nisshin (JP); Toshiki Shinohara, Toyota (JP); Masatoshi Kakutani, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/448,310

(22) Filed: Aug. 11, 2023

(65) Prior Publication Data
US 2024/0073104 A1    Feb. 29, 2024

(30) Foreign Application Priority Data
Aug. 25, 2022   (JP) ................................ 2022-134292

(51) Int. Cl.
*H04L 41/147*     (2022.01)
*H04L 67/12*     (2022.01)

(52) U.S. Cl.
CPC ............ *H04L 41/147* (2013.01); *H04L 67/12* (2013.01)

(58) Field of Classification Search
CPC .............................. H04L 41/147; H04L 67/12
See application file for complete search history.

(56) References Cited

U.S. PATENT DOCUMENTS

| 7,676,224 | B1* | 3/2010 | Bellovin | H04W 4/12 370/328 |
| 11,553,028 | B1* | 1/2023 | Evans | H04L 43/0811 |
| 2006/0047815 | A1* | 3/2006 | Hamadi | G06F 9/5011 709/226 |
| 2010/0151840 | A1* | 6/2010 | Bauchot | H04L 67/52 455/414.1 |
| 2017/0300364 | A1* | 10/2017 | Liu | G06F 9/5027 |
| 2019/0007490 | A1* | 1/2019 | Lindoff | H04W 4/44 |
| 2019/0041853 | A1* | 2/2019 | Jain | G06F 9/5083 |
| 2020/0178198 | A1* | 6/2020 | Ding | H04W 4/44 |
| 2021/0377696 | A1* | 12/2021 | Hagland | H04L 67/52 |

(Continued)

FOREIGN PATENT DOCUMENTS

| JP | 2018-106504 A | | 7/2018 | |
| KR | 20210016459 A | * | 2/2021 | ............ H04W 40/30 |
| WO | WO-2020126439 A1 | * | 6/2020 | ............ H04L 67/12 |

OTHER PUBLICATIONS

English translation of KR 20210016459 A1, provided by PE2E search, 27 pages (Year: 2021).*

(Continued)

*Primary Examiner* — Patrice L Winder
(74) *Attorney, Agent, or Firm* — Oliff PLC

(57) ABSTRACT

A system includes: a server; and a moving body wherein, the server is configured to communicate with the moving body, predict occurrence of a loss of communication with the moving body, and send information necessary to execute a first process to the moving body when the loss of communication with the moving body is predicted to occur; and the moving body is configured to receive the information from the server, and execute the first process based on the received information.

10 Claims, 6 Drawing Sheets

(56) References Cited

U.S. PATENT DOCUMENTS

2022/0169140 A1* 6/2022 Yang .................... G06F 9/4806

OTHER PUBLICATIONS

J. Ott and D. Kutscher, "A disconnection-tolerant transport for drive-thru Internet environments," Proceedings IEEE 24th Annual Joint Conference of the IEEE Computer and Communications Societies., Miami, FL, USA, 2005, pp. 1849-1862 vol. 3, doi: 10.1109/INFCOM.2005.1498464. (Year: 2005).*

* cited by examiner

SYSTEM, SERVER, AND MOVING BODY

CROSS-REFERENCE TO RELATED APPLICATION

This application claims priority to Japanese Patent Application No. 2022-134292 filed on Aug. 25, 2022, incorporated herein by reference in its entirety.

BACKGROUND

1. Technical Field

The present disclosure relates to systems, servers, and moving bodies.

2. Description of Related Art

Japanese Unexamined Patent Application Publication No. 2018-106504 (JP 2018-106504 A) discloses a system including an information management control device (server) that manages information for supporting the operation of a plurality of moving bodies that moves within a predetermined area. In the system described in JP 2018-106504 A, when communication is lost between the information management control device and any of the moving bodies, dynamic data of this moving body is predicted using information accumulated in the device, and the predicted dynamic data is shared with the moving bodies other than this moving body. This allows the moving bodies other than this moving body to receive a service from the device with no missing data.

SUMMARY

However, in the system described in JP 2018-106504 A, any of the moving bodies that has lost communication with the information management control device cannot receive the service from the device while the communication is lost. This is disadvantageous in that the user of this moving body may suffer inconvenience with the service.

The present disclosure provides a system etc. that allows a user to receive a service even while communication is lost so that the user is less likely to suffer inconvenience.

A first aspect of the present disclosure is a system including: a server; and a moving body wherein, the server is configured to communicate with the moving body, predict occurrence of a loss of communication with the moving body, and send information necessary to execute a first process to the moving body when the loss of communication with the moving body is predicted to occur; and the moving body is configured to receive the information from the server, and execute the first process based on the received information.

A second aspect of the disclosure is a server including one or more processors configured to: communicate with a moving body; predict occurrence of a loss of communication with the moving body; and send information necessary to execute part of processes that are supposed to be executed by the server to the moving body when the loss of communication with the moving body is predicted to occur.

A third aspect of the present disclosure is a moving body including one or more processors configured to: receive information necessary to execute part of processes that are supposed to be executed by the server from the server when the server predicts that a loss of communication is going to occur; and execute the part of the processes based on the received information.

According to the system etc. of the present disclosure, when a loss of communication is predicted to occur, the execution of part of processes related to a service is transferred to a moving body. As a result, the user of the moving body can receive the service even while the communication is lost. The user of the moving body is therefore less likely to suffer inconvenience with the service.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

In a system including a server and a moving body that communicate with each other according to the present disclosure, when a loss of communication is predicted to occur between the server and the moving body, execution of part of processes for a service provided by the server is transferred from the server to the moving body before the loss of communication occurs. As a result, the part of the processes can be executed by the moving body even while the communication is lost. The user of the moving body is therefore less likely to suffer inconvenience with the service. Hereinafter, an embodiment of the present disclosure will be described in detail with reference to the drawings.

EMBODIMENT

Configuration

Figure 1:
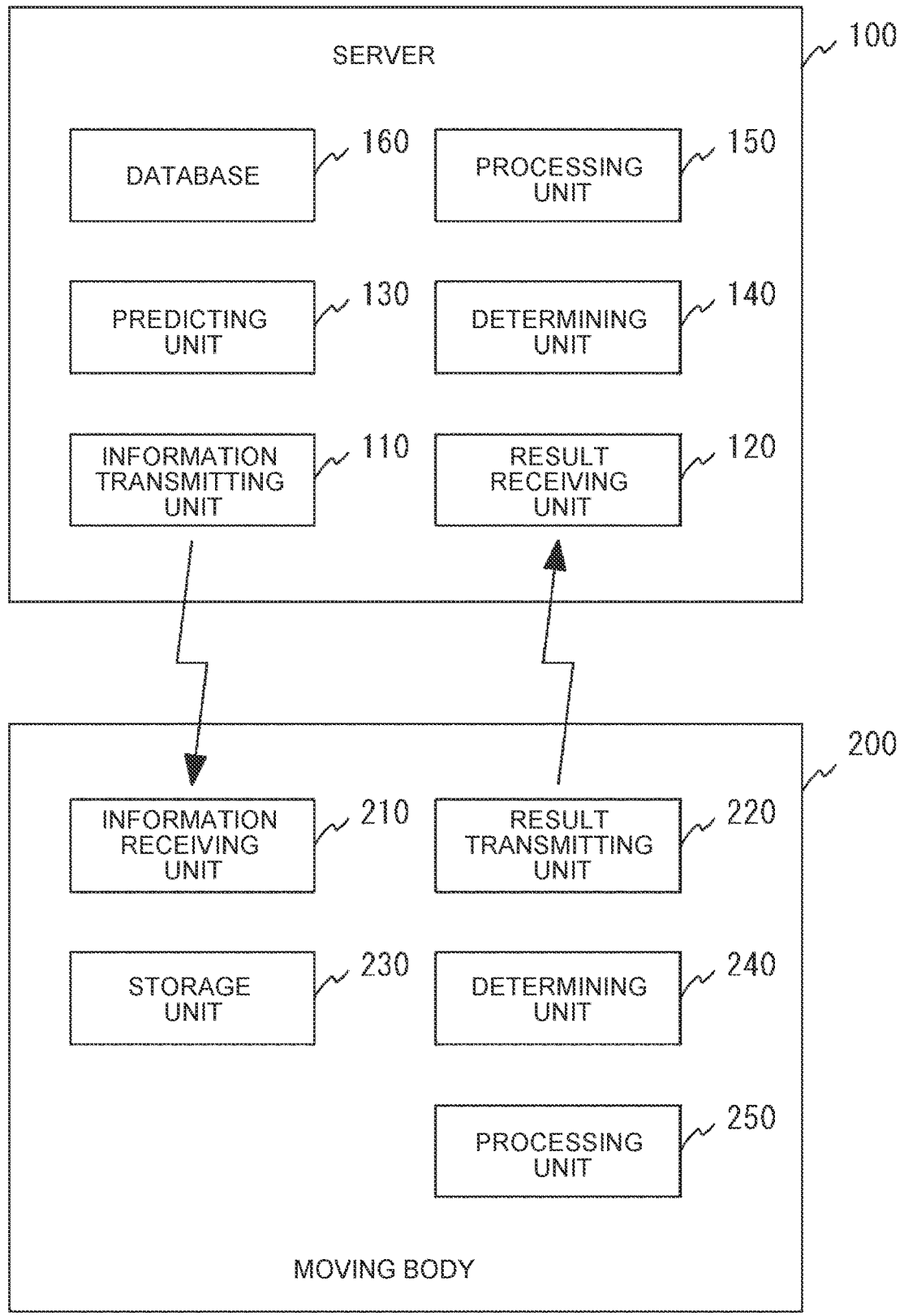
FIG. 1 is a schematic configuration diagram of a system including a server and a moving body according to an embodiment of the present disclosure.

FIG. 1 is a schematic configuration diagram of a system 10 according to an embodiment of the present disclosure. The system 10 illustrated in FIG. 1 is composed of a server 100 and a moving body 200. The server 100 and the moving body 200 are connected so that they can communicate with each other. The number of moving bodies 200 connected to the server 100 may be two or more, and the server 100 and the moving body 200 may be connected via a communication base station, not shown.

(1) Server

The server 100 is configured to communicate with the moving body 200. The server 100 can execute various processes (hereinafter referred to as "server processes") using data and information held by the server 100 itself, data and information acquired from the moving body 200, etc., and can effectively use the execution results of the server processes for the server 100 itself or the moving body 200. An example of the server 100 is a cloud server, namely a server in a cloud.

FIG. 1 shows an example of a functional block diagram of the server 100. The server 100 illustrated in FIG. 1 includes: an information transmitting unit 110 and a result receiving unit 120 that form a communication unit; a predicting unit 130; a determining unit 140; a processing unit 150; and a database 160. The server 100 typically includes a processor such as a central processing unit (CPU), a memory such as a random access memory (RAM), a readable/writable storage medium such as a hard disk drive (HDD) or a solid state drive (SSD), and an input/output interface. The server 100 implements all or part of the functions of the information transmitting unit 110, the result receiving unit 120, the predicting unit 130, the determining unit 140, and the processing unit 150 by the processor reading and executing programs stored in the memory.

The database 160 stores at least information on the communication quality including communication strength in the communication area of the server 100 (hereinafter referred to as "communication environment information"). The communication environment information may be statically provided in advance based on past statistics etc., or may be accumulated (created) by acquiring information on the communication state (communication strength, whether there is a loss of communication, etc.) at each location in the communication area from the moving body 200 as needed.

The predicting unit 130 predicts whether communication between the server 100 and the moving body 200 will be lost in the future (occurrence of a loss of communication). Specifically, the predicting unit 130 predicts the future occurrence of a loss of communication based on the communication environment information stored in the database 160 and information on the state of the moving body 200 (current location, travel speed, direction of travel, etc.). For example, in the case where the moving body 200 will enter a communication area where the communication strength is lower than a predetermined threshold if it continues to move another kilometer or for two more minutes at a current speed in a current direction, the predicting unit 130 can predict that a loss of communication will occur.

When the predicting unit 130 predicts that a loss of communication with the moving body 200 will occur, the determining unit 140 determines a first process the server 100 is going to have the moving body 200 execute while the communication is lost. The first process is part of the server processes that are supposed to be executed by the server 100. More specifically, the first process is a process of performing computation using data held by the server 100 (first data) and data acquired from the moving body 200 via communication (second data). Additionally, the first process is a process that requires constant computation to obtain computation results (process that cannot be stopped), etc. That is, the determining unit 140 determines a server process the server 100 can have the moving body 200 execute in place of the server 100 while the communication is lost to be the first process. Therefore, the content and scale of the first process are appropriately determined based on the duration of the loss of communication (occurrence period) and the area over which the loss of communication occurs (extent of occurrence) so that the moving body 200 executes part of the server processes in place of the server 100 at least while the communication is lost. The priority and weight for the transfer of process execution that are given in advance to each server process may be used to determine the first process.

When the first process is determined by the determining unit 140, the information transmitting unit 110 sends information necessary to execute the first process to the moving body 200. The information necessary to execute the first process includes a processing program (processing codes, software) for the first process, and data held by the server 100 for this processing program (first data).

The result receiving unit 120 receives from the moving body 200 the result of the first process executed by the moving body 200.

When the predicting unit 130 predicts that no loss of communication with the moving body 200 will occur, the processing unit 150 executes all of the server processes. When the predicting unit 130 predicts that a loss of communication with the moving body 200 will occur, the processing unit 150 executes the server processes other than the first process. When the result receiving unit 120 receives the execution result of the first process from the moving body 200, the processing unit 150 combines (merges) the execution result of the first process with the execution results of the server processes other than the first process. The combined information is accumulated in the database 160 etc.

(2) Moving Body

The moving body 200 is a configuration (mobility) that can communicate with the server 100. The moving body 200 can execute various processes (hereinafter referred to as "moving body processes") using data and information it sequentially acquires, etc., and can provide the execution results of the moving body processes to the server 100. An example of the moving body 200 is a vehicle.

FIG. 1 shows an example of a functional block diagram of the moving body 200. The moving body 200 illustrated in FIG. 1 includes: an information receiving unit 210 and a result transmitting unit 220 that form a communication unit; a storage unit 230; a determining unit 240; and a processing unit 250. The moving body 200 can be typically configured as an electronic control unit (ECU) including a processor such as a CPU, a memory such as an RAM, a readable/writable storage medium such as a hard disk drive or a solid state drive, and an input/output interface. This electronic control unit implements all or part of the functions of the information receiving unit 210, the result transmitting unit 220, the determining unit 240, and the processing unit 250 by the processor reading and executing programs stored in the memory.

The information receiving unit 210 receives the information necessary to execute the first process sent from the server 100. The information received by the information receiving unit 210 is stored in the storage unit 230.

When executing the first process as requested by the server 100, the determining unit 240 determines part or all of the moving body processes that need to be stopped instead of the first process to be a second process. That is, the determining unit 240 determines a moving body process that must be put on standby in order to give priority to execution of the first process while the communication is lost to be the second process. Therefore, the necessity, content, and scale of the second process are appropriately determined based on the content of the first process, the processing capability of the moving body 200, the availability of the storage area of the moving body 200, etc. so as not to cause overloads and delays.

When the information necessary to execute the first process is not received from the server 100, the processing unit 250 executes all of the moving body processes. When the information necessary to execute the first process is received from the server 100 but the second process is not determined by the determining unit 240 (second process is not necessary), the processing unit 250 executes the first process and all of the moving body processes. On the other hand, when the information necessary to execute the first process is received from the server 100 and the second process is determined by the determining unit 240, the processing unit 250 executes the first process and the moving body processes other than the second process.

The result transmitting unit 220 sends the result of the first process executed by the processing unit 250 to the server 100.

Control

Next, control that is executed by the system 10 according to the present embodiment will be described with further reference to FIGS. 2 to 6.

(1) First Example of Process Execution Control

Figure 2:
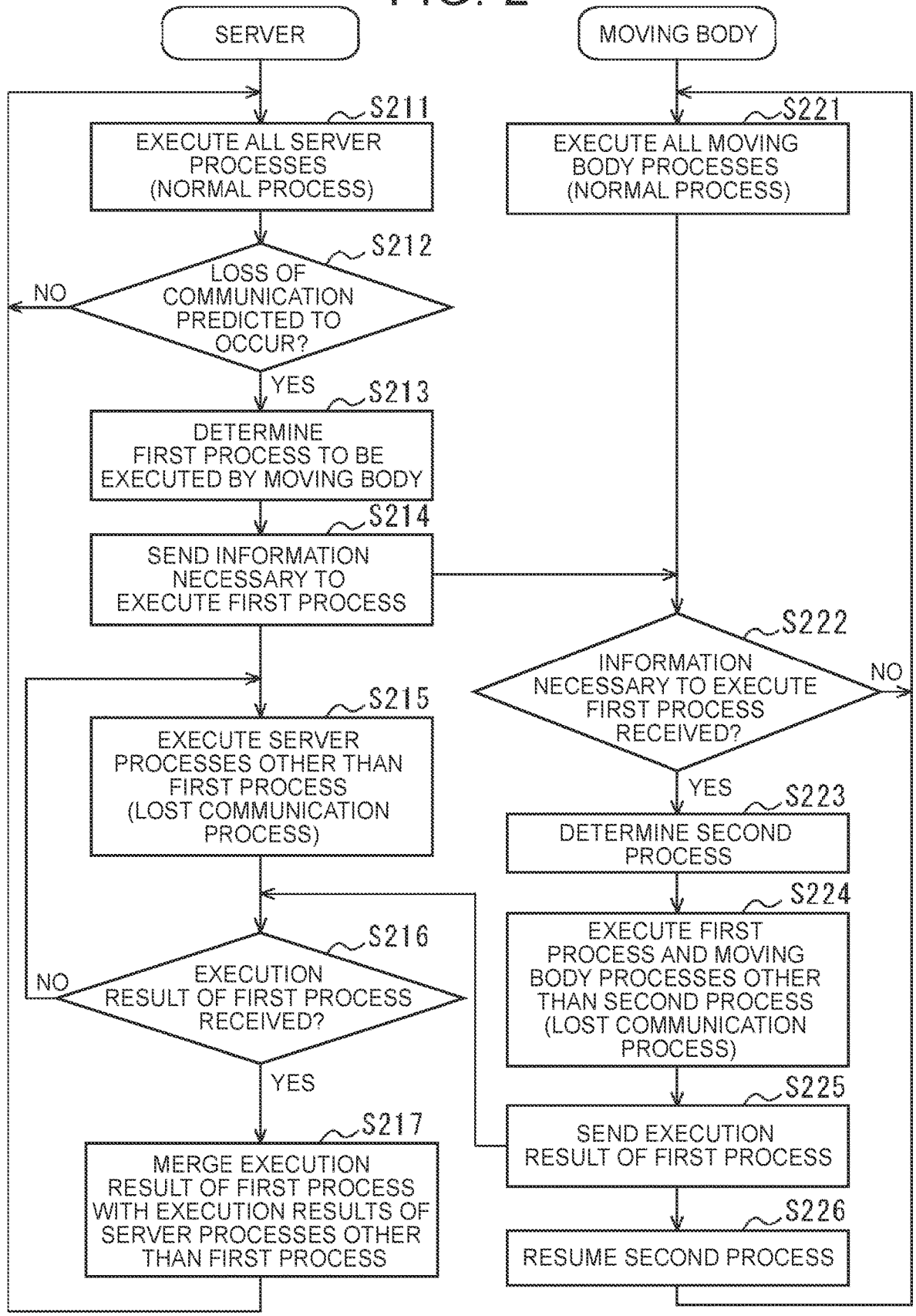
FIG. 2 is a flowchart of process execution control (first example) that is performed by the system.
Figure 3:
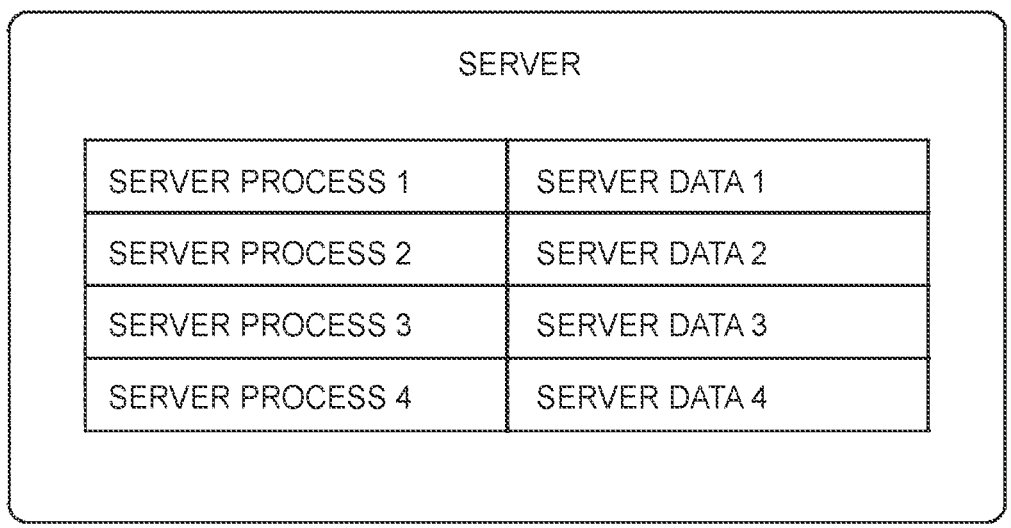
FIG. 3 is an illustration before transfer of process execution from the server to the moving body.
Figure 3:
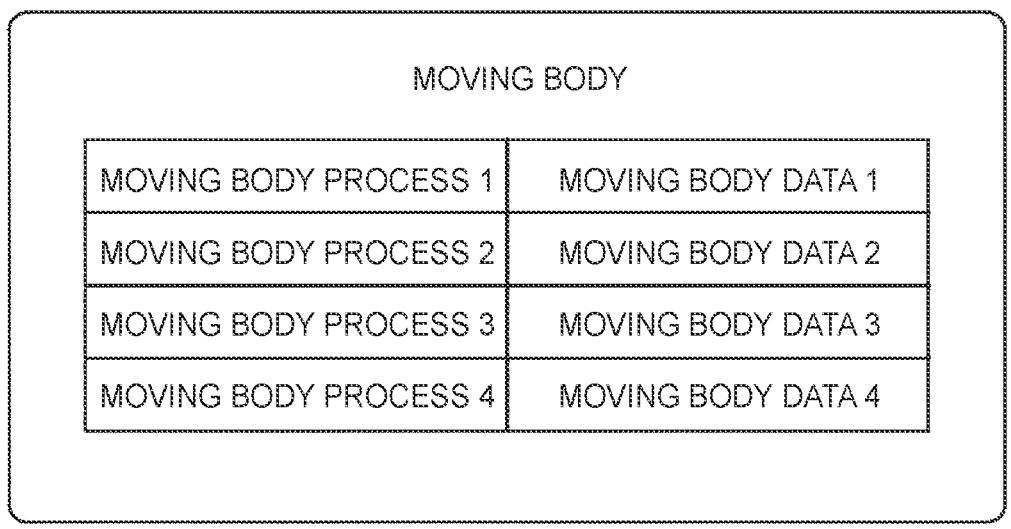
Figure 4:
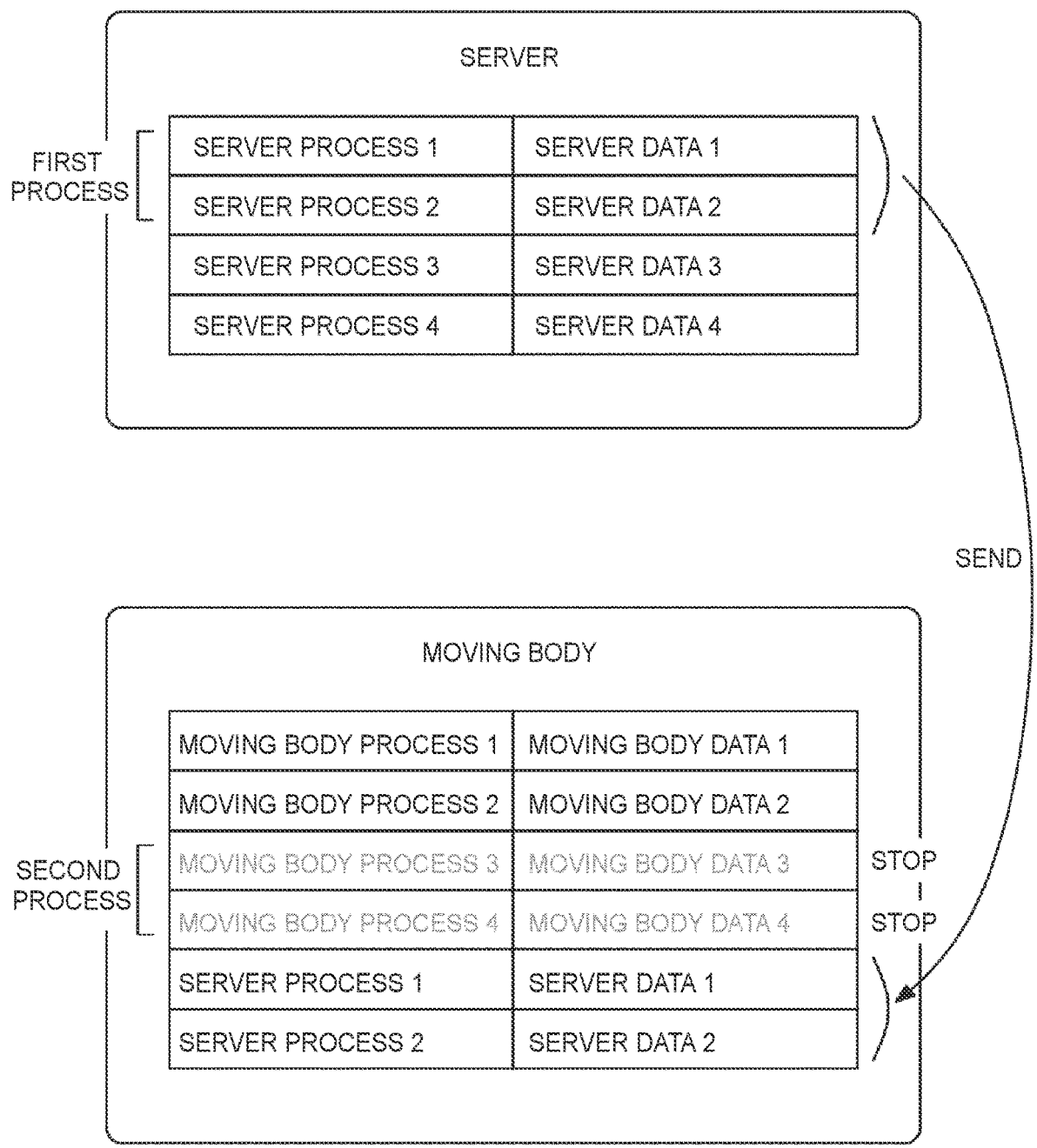
FIG. 4 is an illustration after the transfer of process execution from the server to the moving body (first example)

FIG. 2 is a flowchart illustrating the procedure of a first example of process execution control that is cooperatively performed by the server 100 and the moving body 200. FIG. 3 is an illustration before the transfer of execution of the first process from the server 100 to the moving body 200 in the first example of the process execution control. FIG. 4 is an illustration after the transfer of execution of the first process from the server 100 to the moving body 200 in the first example of the process execution control.

The first example of the process execution control illustrated in FIGS. 2 to 4 is individually performed between the server 100 and one or more moving bodies 200 that have established communication with the server 100.

Step S211

The processing unit 150 of the server 100 performs a process of executing all of the server processes (normal process) as long as no loss of communication is predicted to occur. In the example of FIG. 3, server processes 1 to 4 are the processes to be executed in the normal process by the server 100. In the server 100, the determination of the subsequent step S212 is constantly made while the normal process is being performed.

Step S212

The predicting unit 130 of the server 100 determines whether a loss of communication is predicted to occur between the server 100 and the moving body 200. For example, in the case where the moving body 200 is a vehicle, the predicting unit 130 can predict whether the vehicle will pass through a place where a loss of communication occurs or where there is a possibility that a loss of communication may occur, based on information such as the vehicle's current location, vehicle speed, direction of travel, travel route, traffic congestion condition, and weather. When the predicting unit 130 determines that a loss of communication is predicted to occur (step S212, YES), the process proceeds to step S213. When the predicting unit 130 determines that no loss of communication is predicted to occur (step S212, NO), the process returns to step S211.

Step S213

The determining unit 140 of the server 100 determines the first process the server 100 is going to have the moving body 200 execute in place of the server 100 during the predicted loss of communication lasts. For example, in the case where the moving body 200 is a vehicle, the determining unit 140 can determine the first process based on the area on a route where a loss of communication will occur (start time and end time or start location and end location) as estimated from information such as the vehicle's current location, vehicle speed, direction of travel, travel route, traffic congestion condition, and weather. It is desirable that the amount of the first process be large enough that the process continues to be executed by the moving body 200 while the communication is lost. In the example of FIG. 4, the server process 1 and the server process 2 are determined to be the first process. After the determining unit 140 determines the first process, the process proceeds to step S214.

Step S214

The information transmitting unit 110 of the server 100 sends information necessary to execute the determined first process to the moving body 200. In the example of FIG. 4, the information necessary to execute the first process includes server data 1 necessary to execute the server process 1 and server data 2 necessary to execute the server process 2, in addition to the server process 1 and the server process 2. After the information transmitting unit 110 sends the information necessary to execute the first process to the moving body 200, the process proceeds to step S215.

Step S215

The processing unit 150 of the server 100 performs a process of executing the server processes other than the first process (lost communication process). In the example of FIG. 4, the server process 3 and the server process 4 are the server processes other than the first process. In the server 100, this lost communication process is performed until the execution result of the first process is received from the moving body 200 in the subsequent step S216.

Step S221

The processing unit 250 of the moving body 200 performs a process of executing all of the moving body processes (normal process) until the information necessary to execute the first process is received from the server 100. In the example of FIG. 3, moving body processes 1 to 4 are the processes to be executed in the normal process by the moving body 200. In the moving body 200, the determination of the subsequent step S222 is constantly made while the normal process is being performed.

Step S222

The information receiving unit 210 of the moving body 200 determines whether it has received the information necessary to execute the first process from the server 100. When the information receiving unit 210 has received the information necessary to execute the first process from the server 100 (step S222, YES), the process proceeds to step S223. When the information receiving unit 210 has not received the information necessary to execute the first process from the server 100 (step S222, NO), the process returns to step S221.

Step S223

The determining unit 240 of the moving body 200 determines a moving body process that needs to be stopped instead of the first process to be the second process. Typically, a moving body process with a lower priority than the server processes determined to be the first process is selected as the second process. For example, in the case where the moving body 200 is a vehicle, the determining unit 240 can determine processes such as a process that does not affect the safety and security of vehicle travel to be the second process. In the example of FIG. 4, the moving body process 3 and the moving body process 4 are determined to be the second process. After the determining unit 240 determines the second process, the process proceeds to step S224.

Step S224

The processing unit 250 of the moving body 200 performs a process of executing the first process and the moving body processes other than the second process (lost communication process). The execution of the first process can be started at any time between when the information receiving unit 210 receives the information necessary to execute the first process from the server 100 and the time a loss of communication is predicted to occur by the server 100 (or when a loss of communication actually occurs). In the case where the first process includes a process that requires constant computation, the transferred processes can be seamlessly executed by sending a notification of the start of the first process from the moving body 200 to the server 100. Moreover, starting the first process when a loss of communication is actually detected by the moving body 200 can reduce the risk of the moving body 200 getting into the situation where the moving body 200 is still in the lost communication area even after the first process is finished due to, for example, a traffic congestion being worse than expected. In the example of FIG. 4, the moving body process 1 and the moving body process 2 are the moving body processes other than the second process. The moving body process 3 and the moving body process 4 that are the second process are stopped during execution of the first process. After the processing unit 250 performs the lost communication process, the process proceeds to step S225.

Step S225

The result transmitting unit 220 of the moving body 200 sends the result of the first process executed by the processing unit 250 while the communication was lost to the server 100. At this time, information on the actual duration of the loss of communication and the execution period of the first process may be sent to the server 100 along with the execution result of the first process. With this information, the server 100 can learn whether the amount of the first process is large or small for the occurrence period of the loss of communication. The first process that is determined by the determining unit 140 the next time the moving body 200 moves along the same route can thus be optimized. After the result transmitting unit 220 sends the execution result of the first process to the server 100, the process proceeds to step S226.

Step S226

The processing unit 250 of the moving body 200 resumes executing the moving body process 3 and the moving body process 4, namely the second process that has been stopped. After the processing unit 250 resumes executing the second process, the process returns to step S221.

Step S216

The result receiving unit 120 of the server 100 determines whether it has received from the moving body 200 the result of the first process executed by the moving body 200. When the result receiving unit 120 has received the execution result of the first process from the moving body 200 (step S216, YES), the process proceeds to step S217. When the result receiving unit 120 has not received the execution result of the first process from the moving body 200 (step S216, NO), the process returns to step S215.

Step S217

The processing unit 150 of the server 100 combines (merges) the execution result of the first process executed by the moving body 200 with the execution results of the server processes other than the first process executed by the server 100.

By repeatedly performing the first example of the process execution control described above until the communication between the server 100 and the moving body 200 is cut off, the moving body 200 can receive the service provided by the server 100 even while the communication is lost. The user of the moving body 200 is therefore less likely to suffer inconvenience.

(2) Second Example of Process Execution Control

Figure 5:
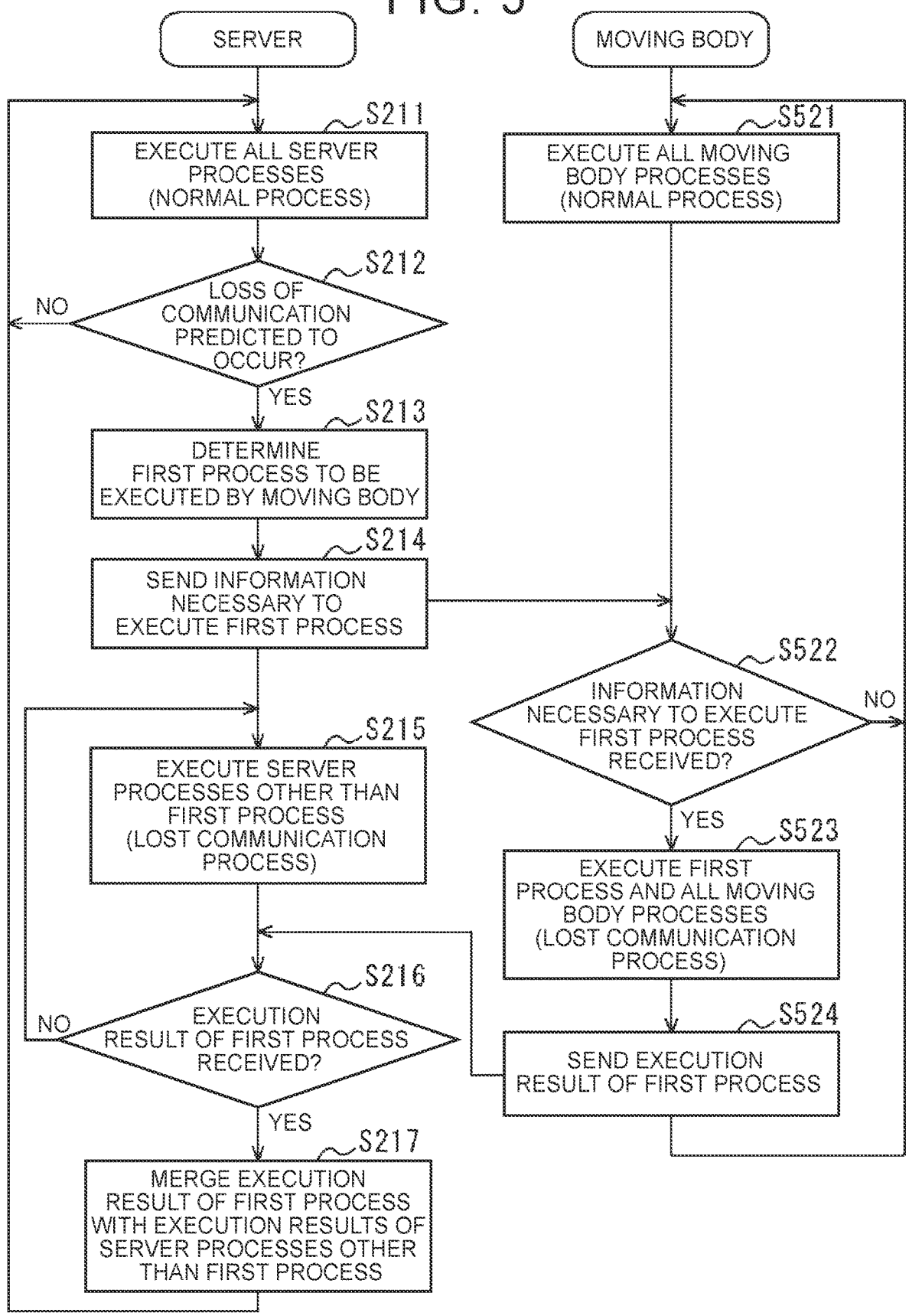
FIG. 5 is a flowchart of process execution control (second example) that is performed by the system.
Figure 6:
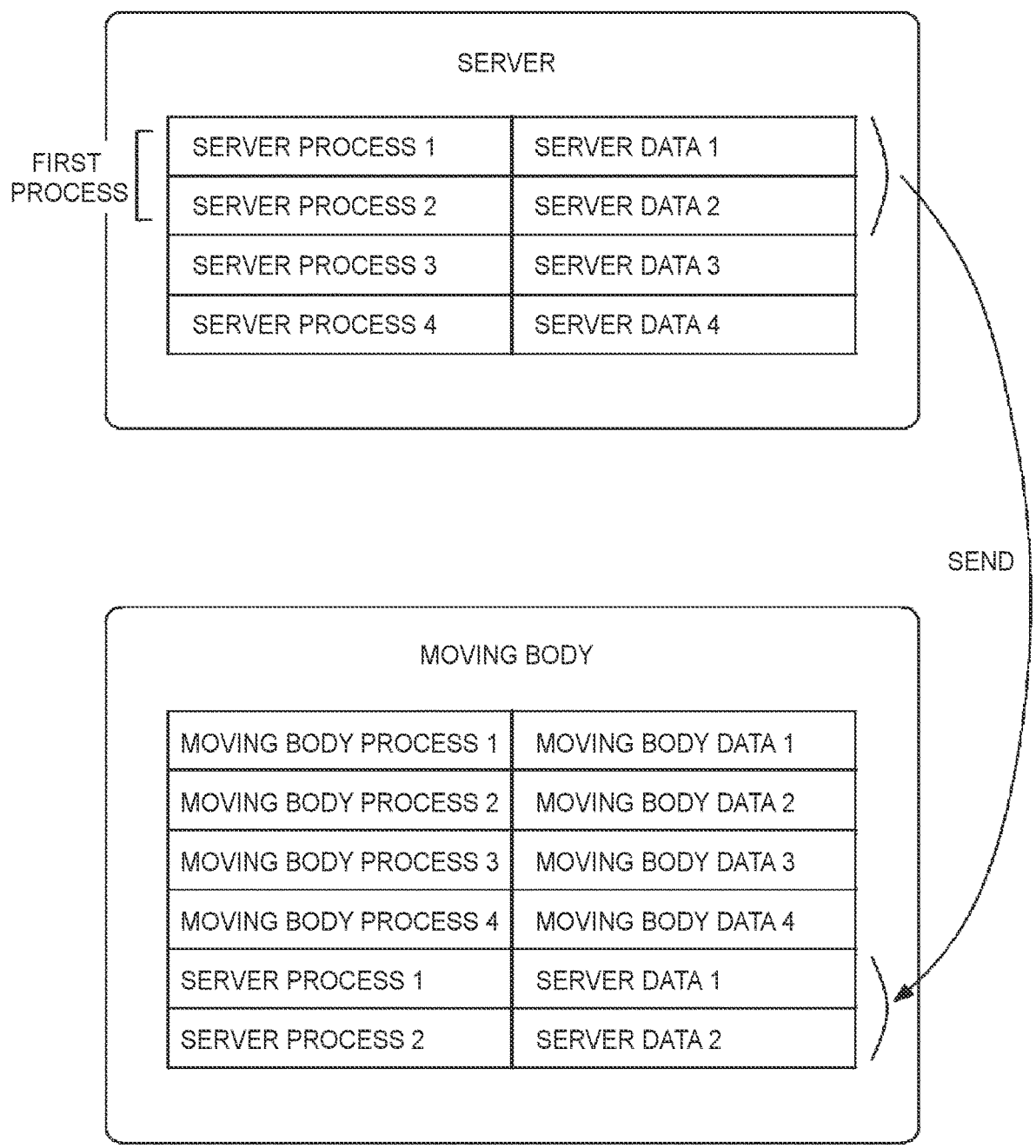
FIG. 6 is an illustration after transfer of process execution from the server to the moving body (second example).

FIG. 5 is a flowchart illustrating the procedure of a second example of the process execution control that is cooperatively performed by the server 100 and the moving body 200. FIG. 6 is an illustration after the transfer of execution of the first process from the server 100 to the moving body 200 in the second example of the process execution control.

The second example of the process execution control illustrated in FIGS. 5 and 6 is different from the first example of the process execution control described above in the steps of the moving body 200 with different step numbers (steps S521 to S524). Hereinafter, description of the steps of the server 100 with the same step numbers will be omitted, and the steps of the moving body 200 will be described. The second example of the process execution control is also individually performed between the server 100 and one or more moving bodies 200 that have established communication with the server 100.

Step S521

The processing unit 250 of the moving body 200 performs a process of executing all of the moving body processes (normal process) until the information necessary to execute the first process is received from the server 100. In the example of FIG. 3, the moving body processes 1 to 4 are the processes to be executed in the normal process by the moving body 200. In the moving body 200, the determination of the subsequent step S522 is constantly made while the normal process is being performed.

Step S522

The information receiving unit 210 of the moving body 200 determines whether it has received the information necessary to execute the first process from the server 100. When the information receiving unit 210 has received the information necessary to execute the first process from the server 100 (step S522, YES), the process proceeds to step S523. When the information receiving unit 210 has not received the information necessary to execute the first process from the server 100 (step S522, NO), the process returns to step S521.

Step S523

The processing unit 250 of the moving body 200 performs a process of executing the first process and all of the moving body processes (lost communication process). Such a lost communication process is performed in the case where there is no need to stop the second process when executing the first process, such as the case where the moving body 200 has a sufficient available storage area or a sufficient processing capacity. The timing of starting the first process and the notification of the start of the first process are as described above. After the processing unit 250 performs the lost communication process, the process proceeds to step S524.

Step S524

The result transmitting unit 220 of the moving body 200 sends the result of the first process executed by the processing unit 250 while the communication was lost to the server 100. At this time, information on the actual duration of the loss of communication and the execution period of the first process may be sent to the server 100 along with the execution result of the first process. After the result transmitting unit 220 sends the execution result of the first process to the server 100, the process returns to step S521.

By repeatedly performing the second example of the process execution control described above until the communication between the server 100 and the moving body 200 is cut off, the moving body 200 can receive the service provided by the server 100 even while the communication is lost. The user of the moving body 200 is therefore less likely to suffer inconvenience.

Operations and Effects

As described above, according to the system 10 of the embodiment of the present disclosure, when the server 100 predicts that a loss of communication with the moving body 200 will occur, the server 100 sends the information necessary to execute the first process (programs, data) to the moving body 200 before the loss of communication occurs in order to have the moving body 200 execute part of the processes the server 100 is originally supposed to execute (first process) in place of the server 100. When the moving body 200 receives the information necessary to execute the first process from the server 100, the moving body 200 also executes the processes the moving body 200 is supposed to execute while giving priority to execution of the first process based on the information.

With this processing, even when the communication is lost and data from the server 100 does not reach the moving body 200, the moving body 200 can execute the first process while the communication is lost. As a result, the moving body 200 can receive the service provided by the server 100 even while the communication is lost. The user of the moving body 200 is therefore less likely to suffer inconvenience with the service.

Although one embodiment of the present disclosure has been described above, the present disclosure can be interpreted as: a system including a server and a moving body that communicate with each other; a server and a moving body that form the system; a method that is performed by a server including a processor and a memory; a method that is performed by a moving body including a processor and a memory; a program for executing these methods; and a computer readable non-transitory storage medium storing the program.

The system of the present disclosure is useful when, for example, a server communicates with a moving body with which a loss of communication is predicted to occur.

What is claimed is:

1. A system, comprising:
a server; and
a moving body, wherein,
the server is configured to
communicate with the moving body,
predict occurrence of a loss of communication with the moving body,
determine a first process which the server has the moving body execute at least while the communication is lost, and
send information necessary for the moving body to execute the first process to the moving body when the loss of communication with the moving body is predicted to occur; and
the moving body is configured to
receive the information from the server,
determine a second process based on the received information, the second process being part of processes that are executed by the moving body while the first process is executed, and
execute the first process based on the received information and stop the second process during the execution of the first process, wherein,
the first process is arithmetic processing performed by the server before the communication is lost using first data held by the server and second data that the server receives from the moving body;
the first process includes a process that requires constant computation to obtain computation results; and
the server is configured to send, as the information, the first data and a program for executing the first process to the moving body.

2. The system according to claim 1, wherein:
the server includes a database storing data on communication quality including communication strength in an area where the moving body is movable; and
the server is configured to predict the occurrence of the loss of communication based on the data on the communication quality at a location to which the moving body is expected to move.

3. The system according to claim 1, wherein:
the server is configured to determine the first process based on an occurrence period and extent of occurrence of the predicted loss of communication.

4. The system according to claim 1, wherein the moving body is configured to execute the first process at least during a period in which the loss of communication with the server lasts.

5. The system according to claim 4, wherein the moving body is configured to determine the second process based on a load associated with the execution of the first process.

6. The system according to claim 3, wherein the moving body is configured to resume executing the second process after the execution of the first process is finished.

7. The system according to claim 1, wherein the moving body is configured to send an execution result of the first process to the server after the loss of communication is restored.

8. The system according to claim 7, wherein the server is configured to:
receive the execution result of the first process from the moving body; and
combine the received execution result of the first process with an execution result of the processes other than the first process executed by the server.

9. A server comprising one or more processors configured to:
communicate with a moving body;
predict occurrence of a loss of communication with the moving body;
determine a first process which the server has the moving body execute at least while the communication is lost; and
send information necessary for the moving body to execute part of processes that are executed by the server to the moving body when the loss of communication with the moving body is predicted to occur, wherein,
the first process is arithmetic processing performed by the server before the communication is lost using first data held by the server and second data that the server receives from the moving body;
the first process includes a process that requires constant computation to obtain computation results; and
the server is configured to send, as the information, the first data and a program for executing the first process to the moving body.

10. A moving body comprising one or more processors configured to:
communicate with a server;
receive information necessary to execute part of processes that are supposed to be executed by the server from the server when the server predicts that a loss of communication is going to occur;

determine a second process based on the received information, the second process being part of processes that are executed by the moving body while a first process is executed; and execute the part of the processes based on the received information and stop the second process during the execution of the first process, wherein, the first process is arithmetic processing performed by the server before the communication is lost using first data held by the server and second data that the server receives from the moving body;

the first process includes a process that requires constant computation to obtain computation results; and the moving body is configured to receive, as the information, the first data and a program for executing the first process from the server.

* * * * *